UNITED STATES PATENT OFFICE.

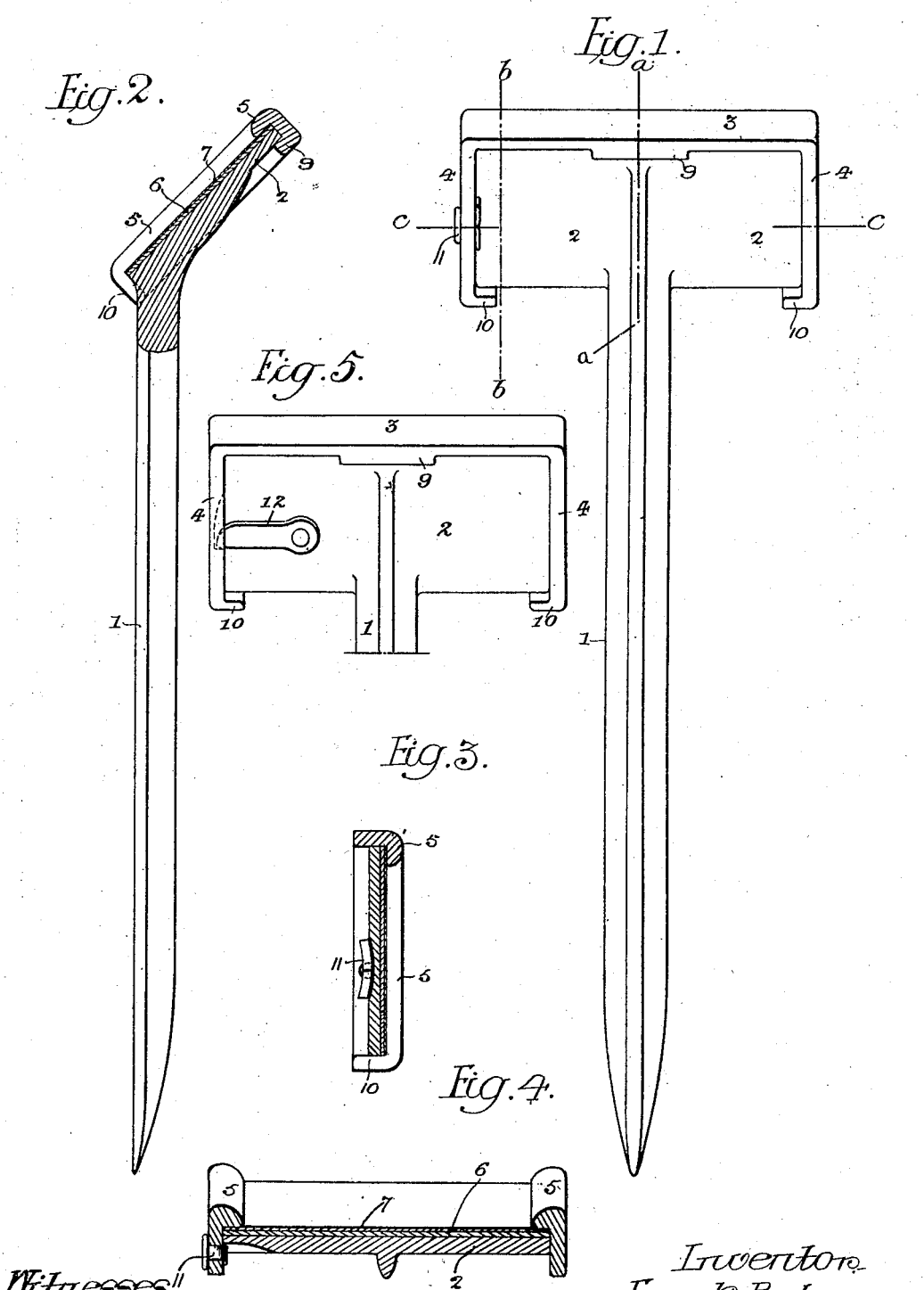

FRANK BATEMAN, OF GRENLOCH, NEW JERSEY, ASSIGNOR TO BATEMAN MANUFACTURING COMPANY, OF GRENLOCH, NEW JERSEY, A CORPORATION OF NEW JERSEY.

PLANT-MARKER.

No. 833,663.     Specification of Letters Patent.     Patented Oct. 16, 1906.

Application filed April 6, 1906. Serial No. 310,339.

*To all whom it may concern:*

Be it known that I, FRANK BATEMAN, a citizen of the United States, residing in Grenloch, New Jersey, have invented certain Improvements in Plant-Markers, of which the following is a specification.

The object of my invention is to provide a simple, cheap, and efficient marking device for use by farmers, market-gardeners, or horticulturists whereby a record of any desired facts concerning a selected plant or row or other group of plants can be kept so as to be readily visible at all times and thoroughly protected from the weather.

In the accompanying drawings, Figure 1 is a rear view of a plant-marker constructed in accordance with my invention. Fig. 2 is a view of the same, partly in side elevation and partly in section, on the line $aa$, Fig. 1. Fig. 3 is a transverse section on the line $bb$, Fig. 1. Fig. 4 is a sectional plan on the line $cc$, Fig. 1; and Fig. 5 is a view illustrating a modification of one of the features of the invention.

The device consists of a metallic stake 1, pointed at the lower end in order that it may be readily driven into the ground, said stake having at the upper end a head 2, inclined in respect to the vertical line of the stake at an angle best adapted for ready observation.

Partially enveloping the head is a frame consisting of a top bar 3 and depending side bars 4, each of these bars having a front flange 5 overlapping the three sides of the head 2, and thus providing a bearing for the card 6, which carries the desired information concerning the plant or group of plants to be marked, the face of this card being protected from the effects of the weather by means of a strip 7 of transparent material, which may be of glass, but which is preferably of celluloid, mica, or other material better adapted than glass to withstand the rough handling to which it is likely to be subjected.

In order to connect the head and frame and yet provide for ready separation of the same when such separation is desired, the top bar 3 of the frame has at the rear a central depending lug 9, and the depending side bars of the frame have at the bottom inturned lugs 10, whereby when the top portion of the head 2 is inserted between the front flange 5 and rear lug 9 of the top bar 3 the lower portion of the head can be swung forwardly over the lugs 10, and all that is then needed in order to effect secure confinement of the head and frame is the provision of some means for preventing the rearward movement of the lower portion of the head. For this purpose many different devices may be used. For instance, one of the depending side bars 4 of the frame may have an opening for the reception of a retaining-key 11, which may be a simple plug of wood or metal overlapping the rear face of the head 2, but which I prefer to make in the form of a split pin, so that its inner ends can be spread apart, as shown in Fig. 1 and 3, whereby the pin not only serves to prevent movement of the head 2 and its surrounding frame independent of each other, but is also locked to the bar 4 of the frame in such manner as will effectually prevent its accidental displacement, although permitting ready removal of the pin when it is desired to separate the head 2 and its surrounding frame in order to remove or replace a card 6.

In Fig. 5 I have shown a latch 12 pivoted upon the back of the head and adapted to engage a recessed portion of one of the side bars 4. It will be observed that while the top and sides of the card 6 are protected by the overlapping flange 5 such flange is absent from the bottom of the card. Hence there is nothing to prevent the free escape of water at the latter point, and there is therefore no likelihood of rain-water gaining access to the card to injure the same or impair the record which it bears.

I claim—

1. A plant-marker consisting of a stake with an enlarged head, and a detachable frame coöperating with said enlarged head to secure a record-card to the face of the same.

2. A plant-marker consisting of a stake with an enlarged head, and a detachable frame coöperating with said enlarged head to secure a record-card to the face of the same, said frame having a flange overlapping the top and sides of the card but not the bottom of the same.

3. A plant-marker consisting of a stake having an enlarged head disposed at an angle to the stake, and a detachable frame coöperating with said enlarged head to secure a record-card to the face of the same.

4. A plant-marker consisting of a stake having an enlarged head, and a frame coacting with said head to secure a record-card to the face of the same, said frame having a front flange, a rear lug depending from its top bar and overlapping the back of the head and other lugs projecting inwardly from the bottom portions of its side bars, and underlapping the bottom of said head.

5. A plant-marker consisting of a stake having an enlarged head, a frame coacting with said head to secure a record-card to the face of the same, lugs on the frame for preventing all movement of the head in respect thereto except rearward movement of the lower portion of said head, and a key for locking said head to one of the side bars of the frame.

6. A plant-marker consisting of a stake having an enlarged head, a frame coacting with said head to secure a record-card to the face of the same, lugs on the frame for preventing all movement of the head in respect thereto, except rearward movement of the lower portion of said head, and a key on a side bar of the frame for engaging the head and preventing such rearward movement.

7. A plant-marker consisting of a stake having an enlarged head, a frame coacting with said head to secure a record-card to the face of the same, lugs on said frame for preventing all movement of the head in respect thereto except rearward movement of the lower portion of said head, and a key on a side bar of the frame for engaging the head and preventing such rearward movement, said key being split so as to engage the side bar of the frame as well as the rear face of the head.

In testimony whereof I have signed my name to this specification in the presence of two subscribing witnesses.

FRANK BATEMAN.

Witnesses:
WALTER CHISM,
JOS. H. KLEIN.